(12) United States Patent
Sandstrom et al.

(10) Patent No.: US 8,948,604 B1
(45) Date of Patent: Feb. 3, 2015

(54) FIELD-TUNABLE DEVICES FOR OPTICAL COMMUNICATION

(75) Inventors: Leif J. Sandstrom, Madison, AL (US); Phillip Stone Herron, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 715 days.

(21) Appl. No.: 12/978,854

(22) Filed: Dec. 27, 2010

(51) Int. Cl.
*H04B 10/00* (2013.01)

(52) U.S. Cl.
USPC ........... 398/135; 398/138; 398/140; 398/192; 398/197

(58) Field of Classification Search
USPC .................................. 398/135–141, 192–197
See application file for complete search history.

(56) References Cited

U.S. PATENT DOCUMENTS

| | | | |
|---|---|---|---|
| 6,441,558 B1 * | 8/2002 | Muthu et al. .................. | 315/149 |
| 6,515,881 B2 * | 2/2003 | Chou et al. ...................... | 363/95 |
| 6,778,784 B1 | 8/2004 | Schrodinger | |
| 6,873,795 B1 * | 3/2005 | Sugaya ............................ | 398/34 |
| 7,333,731 B2 * | 2/2008 | Taylor et al. ................... | 398/138 |
| 7,340,184 B2 * | 3/2008 | Frederiksen et al. ......... | 398/198 |
| 8,571,419 B2 * | 10/2013 | Bouda ............................ | 398/196 |
| 2004/0136722 A1 * | 7/2004 | Mahowald et al. ........... | 398/138 |
| 2004/0264518 A1 * | 12/2004 | Chang ....................... | 372/29.021 |
| 2004/0264973 A1 * | 12/2004 | Bremner et al. ............... | 398/140 |
| 2008/0089699 A1 | 4/2008 | Li et al. | |
| 2008/0166134 A1 | 7/2008 | McCallion et al. | |
| 2008/0170863 A1 * | 7/2008 | Won et al. ...................... | 398/172 |
| 2008/0267627 A1 | 10/2008 | Effenberger | |
| 2013/0183032 A1 * | 7/2013 | Ide et al. .......................... | 398/38 |

* cited by examiner

*Primary Examiner* — Daniel Washburn
*Assistant Examiner* — Hibret Woldekidan
(74) *Attorney, Agent, or Firm* — Maynard Cooper & Gale PC; Jon E. Holland

(57) ABSTRACT

The present disclosure generally pertains to optical communication apparatuses having field-tunable power characteristics. In one exemplary embodiment, an optical communication apparatus has an optical transmitter. The optical transmitter is coupled to logic that receives a user input indicative of a desired transmit mode for the transmitter, and the logic then dynamically tunes the transmitter's output power according to the selected transmit mode. In addition, the optical communication apparatus may have an optical receiver for receiving optical signals. The sensitivity of the receiver is controlled by a bias voltage that is applied to the receiver by the logic. The logic is configured to receive a user input indicative of a desired receive mode and then to tune the receiver's sensitivity via the bias voltage according to the selected receive mode. Accordingly, both the transmitter and receiver of an optical communication apparatus can be tuned in the field to operate in a desired range, and a field technician can therefore utilize the same optical communication apparatus in any of a variety of applications.

18 Claims, 9 Drawing Sheets

Memory (58)

GPON Table (202)

| Temp | Bias Current | Mod Current | Bias Voltage |
|---|---|---|---|
| $T_1$ | $I_{bias1}$ | $I_{mod1}$ | $V_{bias1}$ |
| $T_2$ | $I_{bias2}$ | $I_{mod2}$ | $V_{bias2}$ |
| $T_3$ | $I_{bias3}$ | $I_{mod3}$ | $V_{bias3}$ |

Active Ethernet Table (205)

| Temp | Bias Current | Mod Current | Bias Voltage |
|---|---|---|---|
| $T_1$ | $I_{bias4}$ | $I_{mod4}$ | $V_{bias4}$ |
| $T_2$ | $I_{bias5}$ | $I_{mod5}$ | $V_{bias5}$ |
| $T_3$ | $I_{bias6}$ | $I_{mod6}$ | $V_{bias6}$ |

FIG. 8

FIELD-TUNABLE DEVICES FOR OPTICAL COMMUNICATION

RELATED ART

In optical networks, lasers are used to transmit optical signals across optical fibers, and output power requirements can vary from one network to another. As an example, an Active Ethernet network utilizes a point-to-point architecture, and standards for Active Ethernet require lasers to have an output power between −9.0 dBm and −3.0 dBm. However, a Gigabit Passive Optical Network (GPON) utilizes a point-to-multipoint architecture in which a transmitted optical signal is split for communication to many endpoints. Such an architecture generally requires a higher transmit power since the optical signal's power will ultimately be divided across a plurality of paths by a splitter. Standards for GPON require lasers to have an output power between +0.5 dBm and +5.0 dBm.

During manufacturing, a laser is typically optimized to transmit at a certain output power, referred to herein as "nominal transmit power," at room temperature. Due to process variations and other factors, the nominal transmit power of one laser typically varies with respect to another laser, even for lasers in the same manufacturing batch. The laser's nominal transmit power is often used as a factor in selecting the intended application in which the laser will be used. As an example, if a laser's nominal transmit power is between −9.0 dBm and −3.0 dBm, then the laser might be selected for use in an Active Ethernet application. However, if the laser's nominal transmit power is between +0.5 dBm and +5.0 dBm, then the laser might be selected for use in a GPON application instead.

The transmit power of a laser varies with temperature, and a laser is typically equipped with a feedback circuit that is configured to hold the laser's transmit power close to its nominal power level over temperature. Thus, once a laser is deployed for use in the field, the laser continues to transmit at or close to its nominal power level despite the temperature fluctuations that can be experienced in the field.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 8 is a block diagram illustrating an exemplary embodiment of settings data, such as is depicted by FIG. 7.

DETAILED DESCRIPTION

The present disclosure generally pertains to optical communication apparatuses having field-tunable power characteristics. In one exemplary embodiment, an optical communication apparatus has an optical transmitter. The optical transmitter is coupled to logic that receives a user input indicative of a desired transmit mode for the transmitter, and the logic then dynamically tunes the transmitter's output power according to the selected transmit mode. In addition, the optical communication apparatus may have an optical receiver for receiving optical signals. The sensitivity of the receiver is controlled by a bias voltage that is applied to the receiver by the logic. The logic is configured to receive a user input indicative of a desired receive mode and then to tune the receiver's sensitivity via the bias voltage according to the selected receive mode. Accordingly, both the transmitter and receiver of an optical communication apparatus can be tuned in the field to operate in a desired range.

Therefore, a field technician can utilize the same optical communication apparatus in any of a variety of applications. As an example, if the field technician is deploying an optical communication apparatus in an Active Ethernet environment, then he or she would provide an input for provisioning the optical communication apparatus to transmit at a power and to receive with a sensitivity in accordance with Active Ethernet standards. However, if the technician is deploying the optical communication apparatus in a GPON environment, then he or she would provide an input for provisioning the optical communication apparatus to transmit at a power and to receive with a sensitivity in accordance with GPON standards. Having optical communication apparatuses capable of use in various applications provides the technician with more flexibility in managing hardware, thereby facilitating the services being provided.

Figure 1:
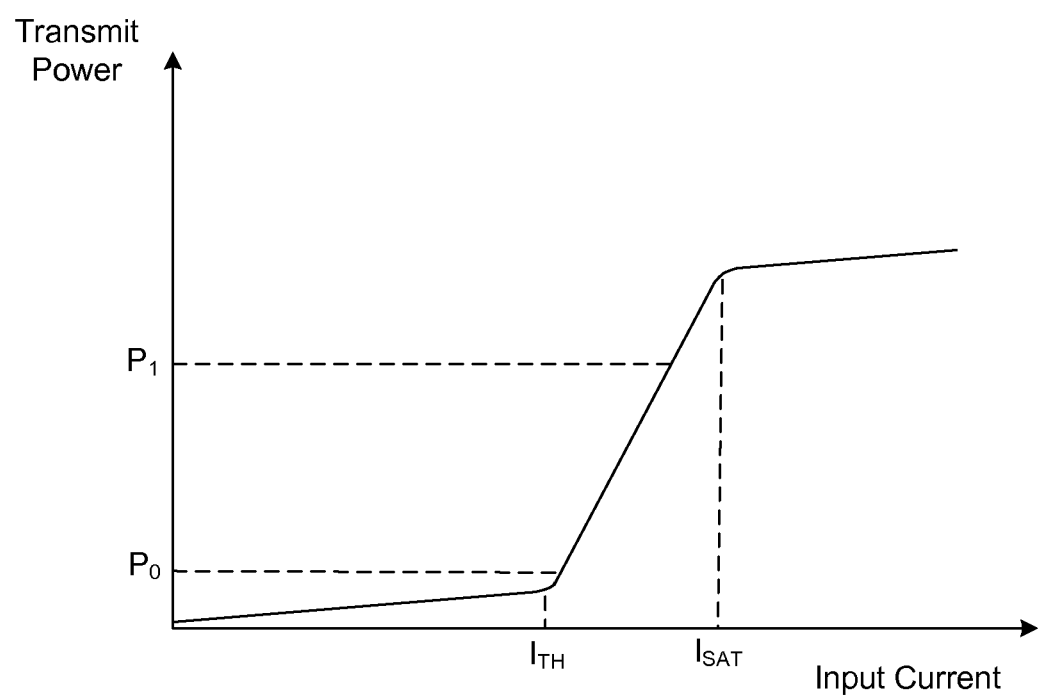
FIG. 1 is a graph illustrating transmit power versus input current for an exemplary optical transmitter.

FIG. 1 depicts a curve representing an exemplary transmit power versus input current for a laser diode. As shown by FIG. 1, the transmit power for the laser diode is low until a threshold current ($I_{TH}$) is reached. Once $I_{TH}$ is reached, the slope of the curve increases significantly indicating that the laser diode provides a much larger increase in transmit power for a given increase in input current up to a saturation current ($I_{SAT}$). The laser diode is deemed to be "off" when it is input current is below $I_{TH}$, and the laser diode is deemed to be "on" when its input current is above $I_{TH}$. In the range between $I_{TH}$ and $I_{SAT}$, the curve is substantially linear, and the laser diode's nominal transmit power is in the linear range between the optical output powers associated with $I_{TH}$ and $I_{SAT}$. Once the current reaches $I_{SAT}$, the laser diode begins to saturate causing the curve to flatten such that there is very little, if any, increase in transmit power for a given increase in input current.

In general, it is desirable to keep the laser diode operating in the linear range between $I_{TH}$ and $I_{SAT}$. Indeed, operating the laser too close to $I_{TH}$ can result in undesirable switching between on and off states. The laser diode can be biased with a bias current to prevent the input current from falling below $I_{TH}$ in operation thereby preventing undesirable behavior from occurring. In this regard, the input current has two components: bias current ($I_{bias}$) and modulation current ($I_{mod}$). The bias current is slightly higher than $I_{TH}$ and is constantly applied to the laser diode to ensure that the input current does not fall below $I_{TH}$. The modulation current is modulated with the data to be transmitted by the laser diode and thus fluctuates between a logical low level and a logical high level. The input current to the laser diode is essentially a summation of the bias current and the modulation current. Thus, the input current fluctuates according to the data pattern being transmitted, but it does not fall below $I_{TH}$ regardless of the data pattern being transmitted due to the presence of the bias current.

$P_0$ represents the diode's steady-state output power for logical low data values, and $P_0$ is preferably set to a power level slightly higher than the power output, referred to hereafter as $P_{TH}$, when the laser diode is driven by $I_{TH}$. Setting $P_0$ closer to $P_{TH}$ desirably provides a greater operating range between $P_0$ and $P_1$, but $P_0$ is preferably set sufficiently higher than $P_{TH}$ within a desired margin of error to ensure that the input current does not fall below $I_{TH}$ thereby causing the laser diode to inadvertently turn off. $P_1$ represents the diode's steady-state output power for logical high data values. As will be described in more detail hereafter, $P_1$ is set based on $P_0$ and the desired extinction ratio, which is typically specified by applicable standards.

Figure 2:
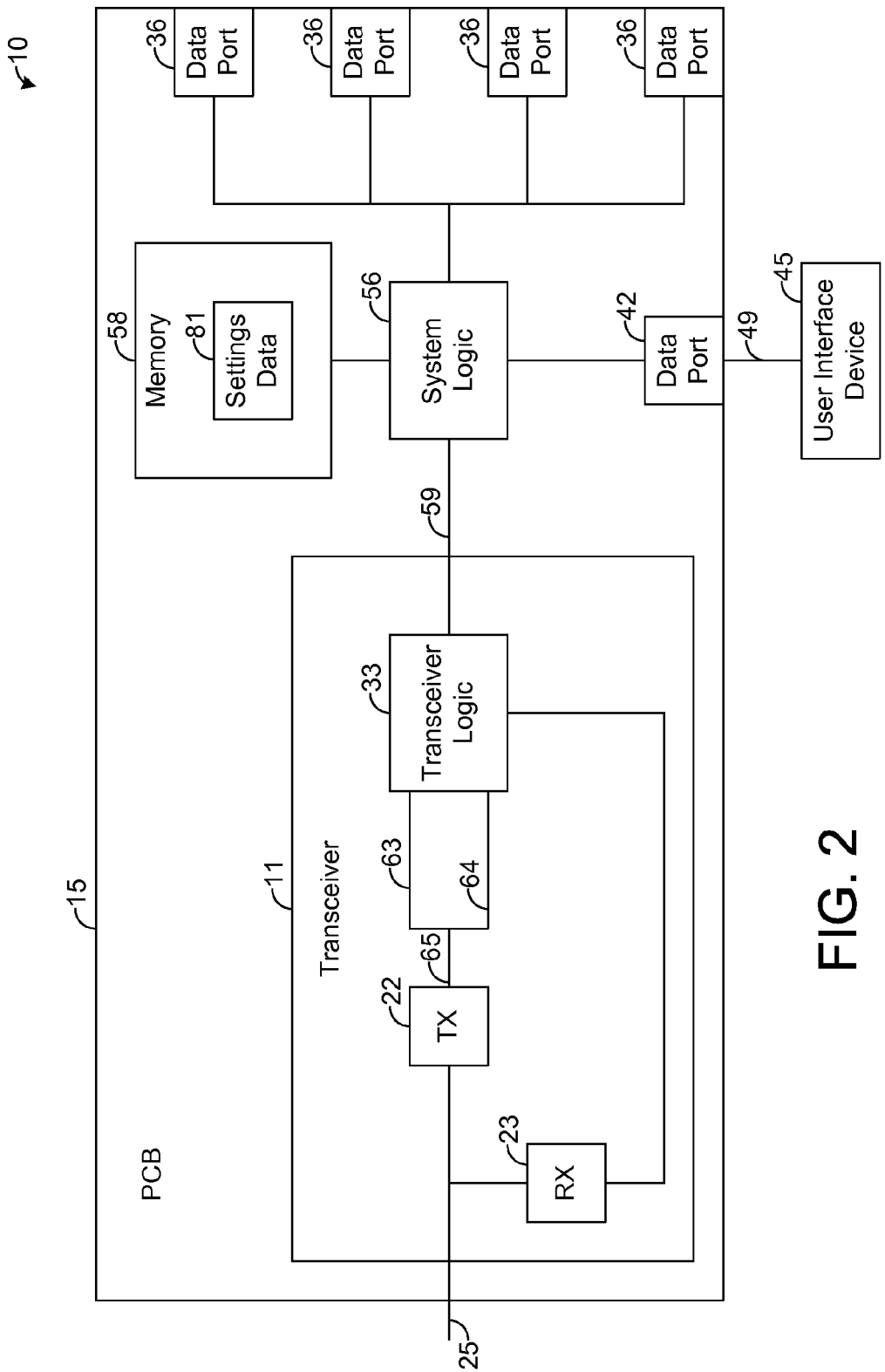
FIG. 2 is a block diagram illustrating an exemplary embodiment of an optical communication apparatus in accordance with the present disclosure.

FIG. 2 depicts an exemplary embodiment of an optical communication apparatus 10 in accordance with the present disclosure. As shown by FIG. 2, the apparatus 10 has an optical transceiver 11 that is mounted on a printed circuit board (PCB) 15 and coupled to an optical fiber 25, which extends to at least one other optical communication apparatus (not shown) communicating via the fiber 25 with the apparatus 10 shown by FIG. 2.

Figure 3:
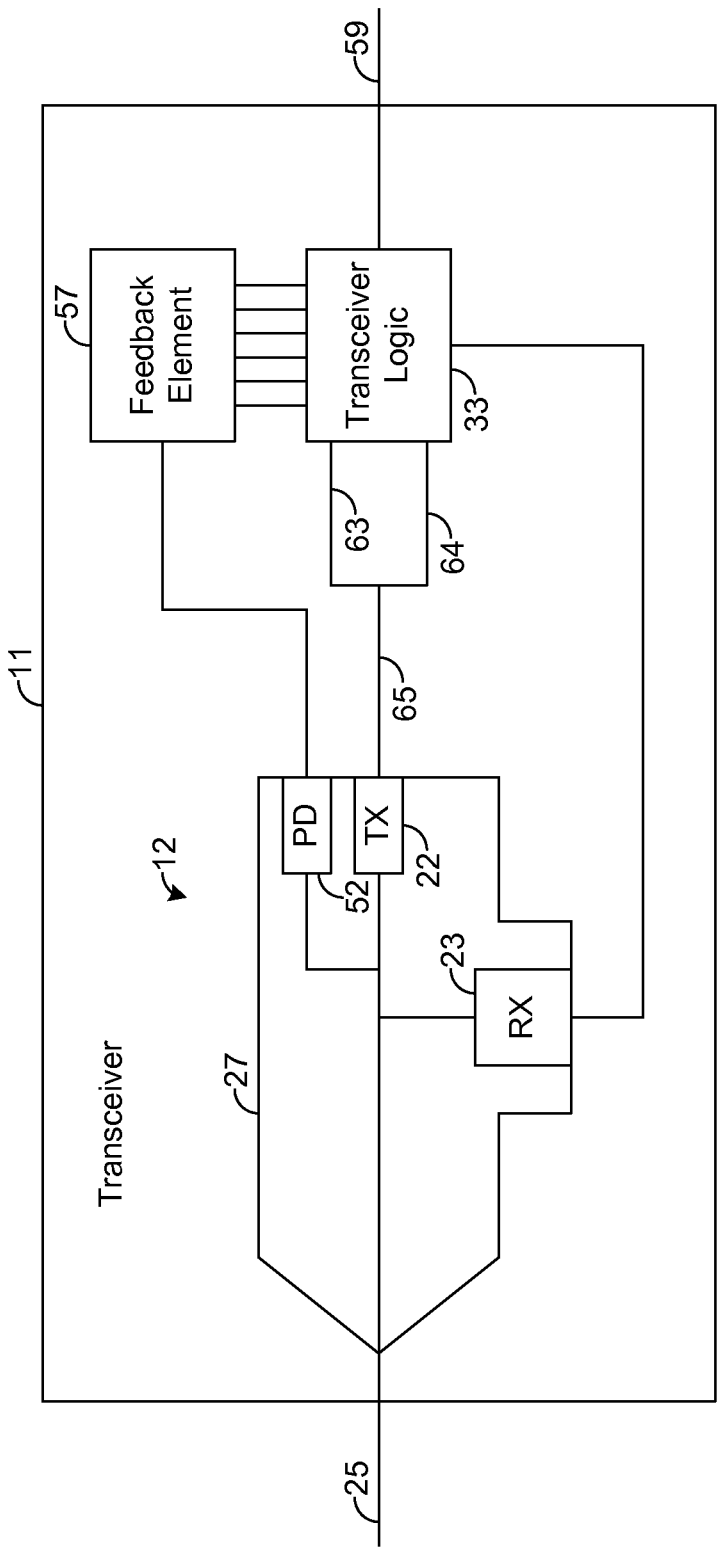
FIG. 3 is a block diagram illustrating an exemplary embodiment of an optical transceiver, such as is depicted by FIG. 2.

As shown by FIG. 3, the optical transceiver 11 has a bi-directional optical sub-assembly (BOSA) 12, which has an optical transmitter 22 (e.g., a laser diode) for transmitting optical signals and an optical receiver 23 (e.g., an avalanche photodiode) for receiving optical signals. The transmitter (TX) 22 and the receiver (RX) 23 are coupled to the optical fiber 25. In one exemplary embodiment, the BOSA 12 is packaged via a metallic canister 27 that houses the transmitter 22 and the receiver 23. Other types of optical sub-assemblies may be employed in other embodiments.

The transmitter 22 is coupled to transceiver logic 33 and is configured to transmit light across the optical fiber 25 in response to an input current signal provided by the transceiver logic 33. In this regard, the transceiver logic 33 is coupled to a conductive connection 63, referred to as the "bias connection," and a conductive connection 64, referred to as the "modulation connection." The connections 63 and 64 are tied together such that the current flowing across the bias connection 63 and the current flowing across the modulation connection 64 are combined and flow across a connection 65 to the transmitter 22.

The output power of the transmitter 22 is proportional to the current level of the input current signal received from the connection 65. In this regard, the transmitter's output power has the characteristics shown by FIG. 1, and the transceiver logic 33 is configured to bias the transmitter 22, as described above, to ensure that the transmitter 22 operates in the linear range above $I_{TH}$. Thus, the input current signal has a bias current component from the connection 63 and a modulation current component from the connection 64. As described above, the current level of the bias current signal is slightly higher than $I_{TH}$ and is applied to the transmitter 22 constantly during operation. Further, the modulation current signal is modulated with data to be transmitted across the optical fiber 25.

The transceiver logic 33 is coupled to system logic 56 (FIG. 2) via at least conductive connection 59. As shown by FIG. 2, the system logic 56 is coupled to at least one data port 36. The exemplary embodiment shown by FIG. 2 has four data ports 36, but the apparatus 10 may have any number of data ports 36 in other embodiments. The data ports 36 receive the data that is to be transmitted across the fiber 25 and, hence, used to modulate the modulation current signal provided to the transmitter 22. As an example, any data port 36 may be coupled to an Ethernet or other type of connection and receive data for transmission across the fiber 25. In such case, the optical communication apparatus 10 receives an electrical signal via the data port 36 and uses the data from such electrical signal to modulate the optical signal transmitted by the transmitter 22. Note that the system logic 56 may perform various formatting and other processing of the data being communicated. As an example, the system logic 56 may strip and/or add overhead information from and/or to any packet being communicated by the apparatus 10. Further, the system logic 56 may convert any packet from one protocol to another. Yet other types of data processing may be performed in other examples.

Referring again to FIG. 3, the transceiver logic 33 is also coupled to the receiver 23, and the transceiver logic 33 provides a bias voltage signal to the receiver 23. The voltage of such signal controls the sensitivity of the receiver 23, which comprises an avalanche photodiode in one exemplary embodiment. Data received by the receiver 23 is transmitted to the transceiver logic 33, which transmits the data to the system logic 56 (FIG. 2). As described above for the data received from the data ports 36, the system logic 56 may be configured to perform formatting or other processing of the data before forwarding such data to the data ports 36.

As shown by FIG. 2, the system logic 56 is coupled to a data port 42 that is detachably coupled to a user interface device 45, such as a computer (e.g., a lap-top, desk-top or notebook computer), personal digital assistant (PDA), or other device which allows a user to provide inputs. In one exemplary embodiment, the data port 42 is a serial data port, such as an RS-232 port, but other types of ports may be used in other embodiments. For example, the data port 42 may be a wireless port such that wireless signals can be communicated with the user interface device 45 thereby obviating the need for a physical connection between the user interface device 45 and the data port 42. In one embodiment, a user plugs the user interface device 45 into the data port 42 via a conductive connection 49 to enable communication with the system logic 56 and then removes the connection 49 from the port 42 once communication with the system logic 56 is no longer desired.

The system logic 56 is configured to operate the apparatus 10 in various modes of operation, referred to as transmit modes (which pertain to the transmit power of the transmitter 22) and receive modes (which pertain to the sensitivity of the receiver 23). Each transmit mode is correlated with a different transmit power range such that the transmitter 22, when operating in one transmit mode, is tuned to transmit in one predefined power range and, when operating in another transmit mode is tuned to transmit in a different predefined power range. Further, each receive mode is correlated with a different receiver sensitivity such that the receiver 23, when operating in one receive mode, is tuned to have a predefined sensitivity and, when operating in another receive mode, is tuned to have a different predefined sensitivity.

The system logic 56 is configured to receive from the user interface device 45 a user input indicative of a desired mode of operation (e.g., transmit mode). The system logic 56 then tunes the transmitter 22 to the transmit power correlated with the indicated transmit mode. In one exemplary embodiment, each transmit mode is correlated with a particular application, such as Active Ethernet or GPON, and the user selects the intended application in which the apparatus 10 is to be used. For example, the user may provide an input selecting GPON from a list of predefined applications supported by the apparatus 10. In response to such input, the system logic 56 automatically correlates the user selection with the appropriate transmit mode. However, in other embodiments, other techniques for indicating the desired transmit mode are possible.

As a mere example, control information indicating the desired transmit mode may be transmitted to the system logic 56 via management packets or in the header of data packets processed by the system logic 56. Such management or data packets may be received from the optical fiber 25 and/or the data ports 36.

Once the system logic 56 has identified the transmit mode to be used in operation, the system logic 56 controls the transceiver 11 such that the transmitter 22 is tuned to the power range correlated with the identified transmit mode. In particular, the transceiver logic 33 communicates with the system logic 56 to determine the desired transmit mode and then controls the input current signal provided to the transmitter 22 such that the transmitter 22 transmits in the correlated power range. The transceiver logic 33 also adjusts the input current signal over time to keep the average transmit power in the correlated range despite temperature fluctuations and aging effects.

Similarly, the system logic 56 is configured to receive from the user interface device 45 a user input indicative of a receive mode. Note that this user input may be the same user input for indicating the desired transmit mode or may be a different input. In response to the user input indicative of the desired receive mode, the system logic 56 controls the transceiver 11 such that the receiver's sensitivity is tuned to the level correlated with the indicated receive mode. Note that the data indicative of the desired receive mode may be from other sources, as described above for the data indicative of the transmit mode. As an example, the data indicative of the receive mode may be received from the optical fiber 25 and/or data ports 36.

FIG. 3 depicts an exemplary embodiment of the transceiver 11 in which feedback from the BOSA 12 is used to control the input current for driving the transmitter 22. In such embodiment, the BOSA 12 comprises a power detector (PD) 52, and the transceiver 11 comprises a feedback element 57 that is coupled to the power detector 52 and the transceiver logic 33.

When the system logic 56 (FIG. 2) receives, from the data ports 36, data to be transmitted across the optical fiber 25, the system logic 56 processes (e.g., reformats) the data as may be desired and transmits the data to the transceiver logic 33. The transceiver logic 33 modulates an electrical signal with the data and transmits the electrical signal via the connection 64 thereby providing the modulation current signal described above. The transceiver logic 33 also transmits the bias current signal across the connection 63. Thus, the transmitter 22 receives the input current signal, which comprises both the bias current signal and the modulation current signal, via connection 65 and modulates an optical signal with the data defined by the modulation current signal.

The modulated optical signal is transmitted across the optical fiber 25 and is also simultaneously detected by the power detector 52, which measures the power of the transmitted signal and provides a feedback signal that has a voltage proportional to the measured power. In one exemplary embodiment, the power detector 52 includes a monitor photodiode positioned at the back facet of the laser and designed to sense the power of the optical signal, but other techniques or devices for measuring the power of the optical signal are possible. The power detector 52 is coupled to the feedback element 57 and provides the feedback signal to such element 57. Based on the feedback signal, the element 57 determines whether to adjust the bias current signal and/or modulation current signal in order keep the transmit power within the range correlated with the transmit mode in which the transmitter 22 is operating.

There are various techniques that can be used to determine whether to adjust the input current based on the feedback signal. In one exemplary embodiment, the feedback element 57 compares the feedback signal to a set of voltage thresholds, an upper voltage threshold ($V_{P1}$) and a lower voltage threshold ($V_{P0}$), which are established based on user input. In particular, as will be described in more detail hereafter, the thresholds are selected based on which transmit mode is selected for operation. In one exemplary embodiment, $V_{P0}$ corresponds to $P_0$, and $V_{P1}$ corresponds to $P_1$. In this regard, $V_{P0}$ represents the voltage of the feedback signal when the output power of the transmitter 22 is at the desired $P_0$ for the selected transmit mode, and $V_{P1}$ represents the voltage of the feedback signal when the output power of the transmitter 22 is at the desired $P_1$ for the selected transmit mode.

During operation, the feedback element 57 compares the feedback signal to $V_{P0}$ when the feedback signal is indicative of the measured transmit power when the transmitter 22 is driven by just the bias current such that the power sensed by the power detector 52 is at or close to a minimum for the present settings of the bias and modulation current. In particular, the transceiver logic 33 monitors the flow data being sent to the transmitter 22 for a string of a predetermined number of consecutive logical lows (i.e., 0's). The transceiver logic 33 activates the comparison of $V_{P0}$ to the feedback signal when the feedback signal is from a measurement of the last 0 of such a string. Further, the predetermined number of consecutive logical lows is large enough such that the power measured by the power detector 52 has settled at a steady-state minimum for the present operating range of the transmitter 22. That is, the string of 0's is long enough such that the modulation current (i.e., the most recent logical high) has only a small, if any, effect on the power being measured. Thus, the power measured by the power detector 52 and compared to $P_0$ is attributed almost exclusively to driving the transmitter 22 with the bias current.

For such comparison of $V_{P0}$ to the feedback signal, if the voltage of feedback signal is less than $V_{P0}$, then the feedback element 57 is configured to cause a slight increase to the current level of the bias current signal. If the voltage of the feedback signal is greater than $V_{P0}$, then the feedback element 57 is configured to cause a slight decrease to the current level of the bias current signal. If the voltage of the feedback signal is equal to $V_{P0}$, then the feedback element 57 causes no adjustment to the bias current signal. In one exemplary embodiment, the feedback element 57 is configured to make an adjustment after the threshold has been surpassed consecutively in one direction or the other a predetermined number of times, as will be described in more detail hereafter. As shown by FIG. 3, the feedback element 57 is coupled to the transceiver logic 33, which is configured to adjust the bias current signal based on the feedback provided by the feedback element 57.

In addition, the feedback element 57 compares the feedback signal to $V_{P1}$ when the feedback signal is indicative of the measured transmit power when the transmitter 22 is being driven by both the bias current and the modulation current (at a logical high) such that the power sensed by the power detector 52 is at or close to a maximum for the present settings of the bias and modulation current. In particular, the transceiver logic 33 monitors the data being sent to the transmitter 22 for a string of a predetermined number of consecutive logical highs (i.e., 1's). The transceiver logic 33 activates the comparison of $V_{P1}$ to the feedback signal when the feedback signal is from a measurement of the last 1 of such a string. Further, the predetermined number of consecutive logical highs is large enough such that the power measured by the power detector 52 has settled to a steady-state maximum for the present operating range of the transmitter 22. That is, the string of 1's is long enough such that the effect of the modulation current on the measured power is at a maximum for the present setting of the modulation current.

For such comparison of $V_{P1}$ to the feedback signal, if the voltage of the feedback signal is less than $V_{P1}$, then the feedback element 57 is configured to cause a slight increase to the current level of the modulation current signal. If the voltage of the feedback signal is greater than $V_{P1}$, then the feedback element 57 is configured to cause a slight decrease to the current level of the modulation current signal. If the voltage of the feedback signal is equal to $V_{P1}$, then the feedback element 57 makes no adjustment to the modulation current signal. In one exemplary embodiment, the feedback element 57 may be configured to make an adjustment after the threshold has been surpassed consecutively in one direction or the other a predetermined number of times, as will be described in more detail hereafter. As shown by FIG. 3, the feedback element 57 is coupled to the transceiver logic 33, which is configured to adjust the modulation current signal based on the feedback provided by the feedback element 57.

Accordingly, the transmit power is maintained within a desired range between $P_0$ and $P_1$ established by the thresholds $V_{P0}$ and $V_{P1}$. Note that the adjustments described above accommodate temperature fluctuations and aging effects. In this regard, temperature fluctuations and aging effects cause changes in the transmit power. However, the feedback element 57 makes appropriate adjustments to the bias current signal and/or the modulation current signal, based on the comparisons of the feedback signal to $V_{P0}$ and $V_{P1}$, such that the output power of the transmitter 22 remains within the desired range despite the temperature fluctuations and aging effects.

Figure 4:
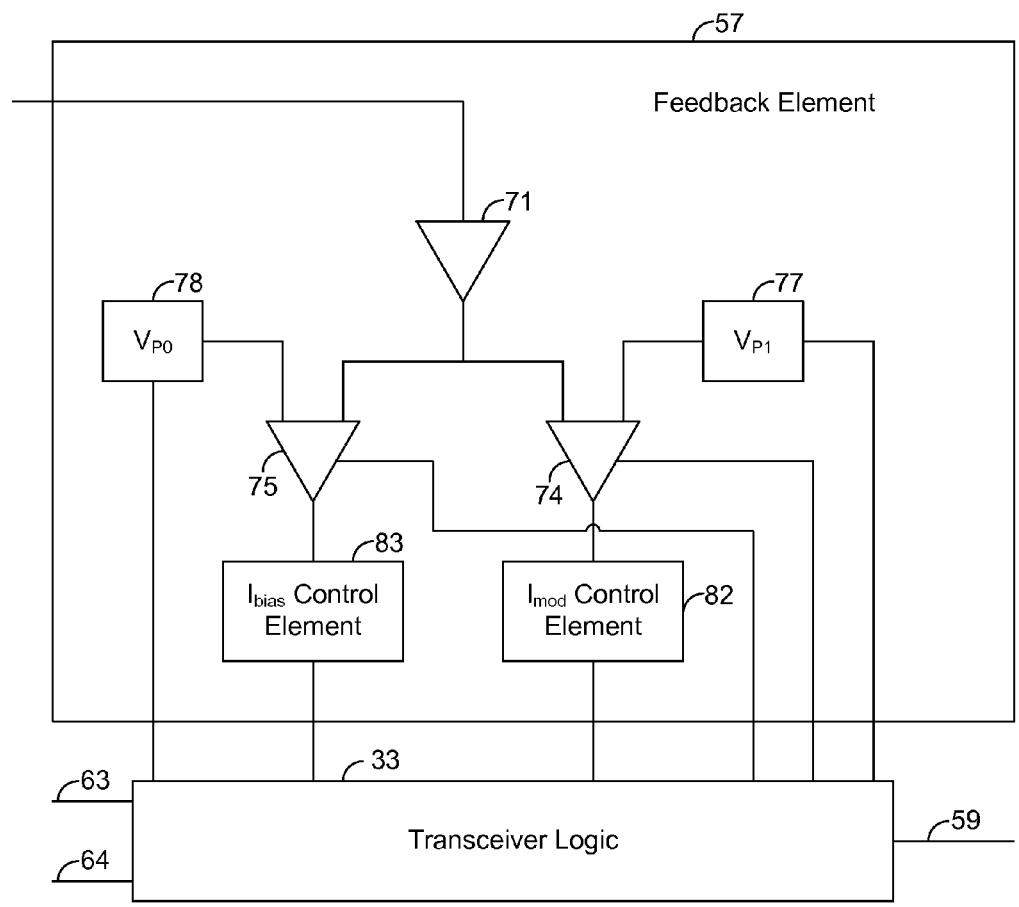
FIG. 4 is a block diagram illustrating an exemplary embodiment of a feedback element, such as is depicted by FIG. 3.

FIG. 4 depicts an exemplary embodiment of the feedback control element 57.

In the embodiment depicted by FIG. 4, the feedback signal transmitted by the power detector 52 (FIG. 3) is a current signal such that the signal's current is indicative of the measured power. In particular, the signal's current varies proportionally with the measured power. As shown by FIG. 4, the feedback element 57 of FIG. 4 comprises a transimpedance amplifier 71 that is coupled to the power detector 52 (FIG. 3) and configured to receive the feedback signal. The amplifier 71 converts the feedback signal from a current signal to a voltage signal such that the signal's voltage is indicative of the measured power and, in particular, varies proportionally with the measured power. The output of the amplifier 71 is coupled to an input of a plurality of comparators 74 and 75. The comparator 74 has another input that is coupled to a register 77 that is storing the value of $V_{P1}$, and the comparator 75 has another input that is coupled to a register 78 that is storing the value of $V_{P0}$.

The comparator 74 receives from the register 77 a voltage signal indicative of the value of $V_{P1}$. When a comparison of the feedback signal to $V_{P1}$ is to be activated, as determined by the transceiver logic 33, the transceiver logic 33 temporarily activates the comparator 74. If the voltage of the feedback signal exceeds the voltage of $V_{P1}$ when the comparator 74 is activated, the comparator 74 outputs a positive value. If the voltage of the feedback signal is less than the voltage of $V_{P1}$ when the comparator 74 is activated, the comparator 74 outputs a negative value. If the voltage of the feedback signal is equal to the voltage of $V_{P1}$ when the comparator 74 is activated, the comparator 74 outputs a value of 0.

A modulation current ($I_{mod}$) control element 82 is coupled to the output of the comparator 74. The element 82 counts the number of times that the comparator 74 outputs a negative value, and the element 82 counts the number of times that the comparator 74 outputs a positive value. If the count of consecutive negative values exceeds a threshold, then the element 82 transmits to the transceiver logic 33 a control signal that causes such logic 33 to increase the modulation current. If the count of consecutive positive values exceeds the threshold, then the element 82 transmits to the transceiver logic 33 a control signal that causes such logic 33 to decrease the modulation current.

Similarly, the comparator 75 receives from the register 78 a voltage signal indicative of the value of $V_{P0}$. When a comparison of the feedback signal to $V_{P0}$ is to be activated, as determined by the transceiver logic 33, the transceiver logic 33 temporarily activates the comparator 75. If the voltage of the feedback signal exceeds the voltage of $V_{P0}$ when the comparator 75 is activated, the comparator 75 outputs a positive value. If the voltage of the feedback signal is less than the voltage of $V_{P0}$ when the comparator 75 is activated, the comparator 75 outputs a negative value. If the voltage of the feedback signal is equal to the voltage of $V_{P0}$ when the comparator 75 is activated, the comparator 75 outputs a value of 0.

A bias current ($I_{bias}$) control element 83 is coupled to the output of the comparator 75. The element 83 counts the number of times that the comparator 75 outputs a negative value, and the element 83 counts the number of times that the comparator 75 outputs a positive value. If the count of consecutive negative values exceeds a threshold, then the element 83 transmits to the transceiver logic 33 a control signal that causes such logic 33 to increase the bias current. If the count of consecutive positive values exceeds the threshold, then the element 83 transmits to the transceiver logic 33 a control signal that causes such logic 33 to decrease the bias current.

In one exemplary embodiment, the values stored in the registers 77 and 78 are controlled by the system logic 56 based on user input. In this regard, referring to FIG. 2, settings data 81 is stored in memory 58. The settings data 81 defines multiple sets of thresholds in which each set comprises a value for $V_{P0}$ and a value for $V_{P1}$ and is correlated with a respective one of the transmit modes. Further, storing a different set of thresholds in the registers 77 and 78 causes the transmitter 22 to operate in a different power range. In this regard, changing the values in the registers 77 and 78 has the effect of changing the amount of adjustments made to the bias and modulation current signals by the feedback element 57 thereby changing the total input current that is used to drive the transmitter 22. As a result, the transmitter 22 operates in a different power range.

As described above, a user provides an input that is received via the data port 42 and that indicates a desired transmit mode for the apparatus 10. In other embodiments, such input can be received via other techniques, such as from the optical fiber 25 or the data ports 36. Based on such input, the system logic 56 is configured to retrieve from the settings data 81 the set of thresholds correlated with the indicated transmit mode. The system logic 56 then loads $V_{P1}$ of the retrieved set of thresholds into the register 77 and $V_{P0}$ of the retrieved set of thresholds into the register 78. Accordingly, as the transmitter 22 is driven by the bias current and the modulation current provided by the transceiver logic 33, the feedback element 57 makes appropriate adjustments to the bias current and/or modulation current such that the transmit power of the transmitter 22 remains in the range correlated with the transmit mode in which the apparatus 10 is operating.

Figure 5:
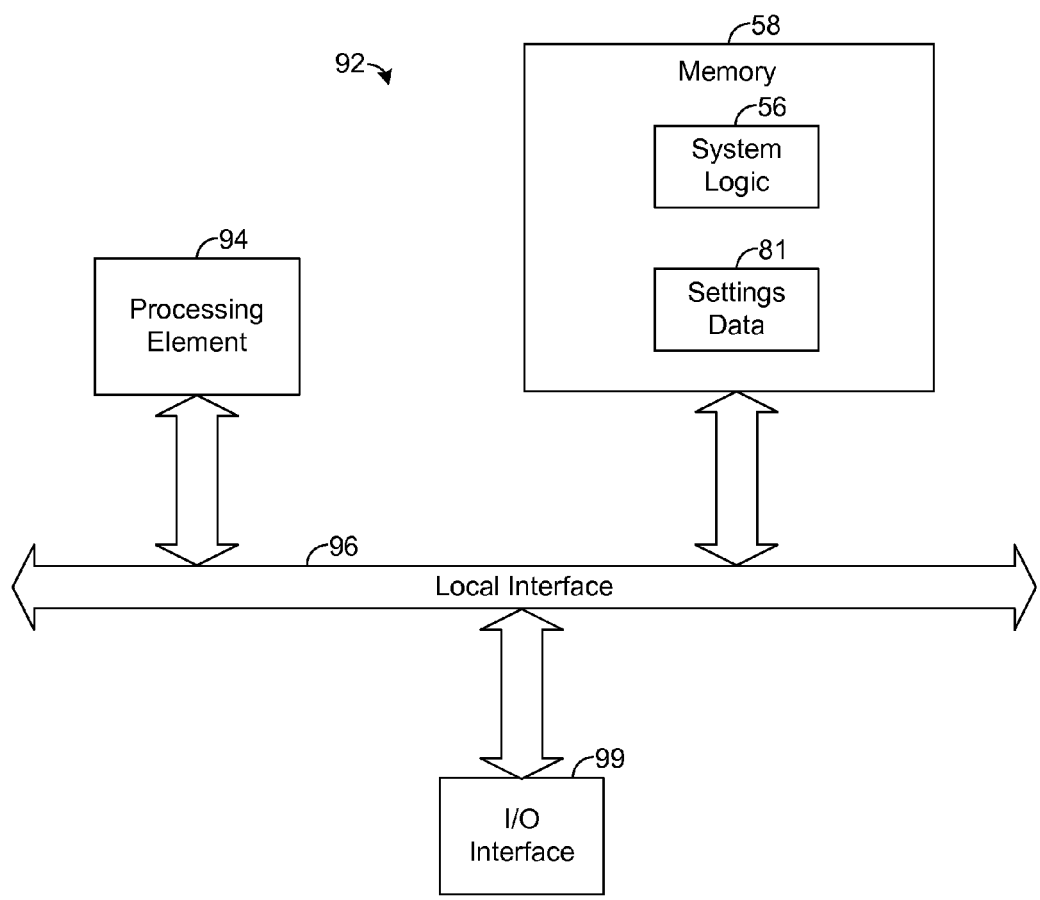
FIG. 5 is a block diagram illustrating an exemplary embodiment of an instruction execution apparatus for executing instructions of system logic, such as is depicted by FIG. 3.

It should be noted that the functionality performed by the transceiver logic 33, system logic 56, and feedback element 57 can be implemented in software, hardware, firmware, or any combination thereof. In one exemplary embodiment, the feedback element 57 and the transceiver logic 33 are implemented in hardware, and the system logic 56 is implemented in software and stored within an instruction execution apparatus, such as a microprocessor. FIG. 5 depicts an exemplary instruction execution apparatus 92 that is configured to store and execute the system logic 56 when such logic 56 is implemented in software. As shown by FIG. 5, the apparatus 92 comprises the memory 58, which is used to store the settings data 81 and the instructions of the system logic 56.

Note that the system logic 56, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the instruction apparatus 92 depicted by FIG. 5 comprises at least one conventional processing element 94, such as a digital signal processor (DSP) or a central processing unit (CPU), that communicates to and drives the other elements within the apparatus 92 via a local interface 96, which can include at least one bus. Furthermore, an input/output (I/O) interface 99 can be used to communicate with devices external to the apparatus 92, such as the data ports 36 and 42, the transceiver logic 33, and the feedback element 57.

An exemplary use and operation of the apparatus 10 will now be described below with particular reference to FIG. 6.

During manufacturing, the apparatus 10 is tested to determine sets of voltage thresholds, $V_{P0}$ and $V_{P1}$, for providing various ranges of transmit power. For illustrative purposes, assume that it is desirable for the apparatus 10 to be compatible for use in either GPON (which requires a transmit power between +0.5 dBm and +5.0 dBm) or Active Ethernet (which requires a transmit power between −9.0 dBm and −3.0 dBm). For such an example, the apparatus 10 and, specifically, the transmitter 22 is manufactured to have a nominal transmit power at a level between the two target ranges (i.e., between −3.0 dBm and +0.5 dBm), although it is possible for the nominal transmit power to be within the target range of GPON or Active Ethernet in other embodiments. Designing the transmitter 22 to have a nominal transmit power between the two target ranges helps to avoid the possibility of saturation and falling below lasing threshold during operation. In this regard, if the nominal power level is too far from a desired range, then severe relaxation oscillation or saturation may result when the input current signal is adjusted to tune the transmitter 22 to the desired power range. Depending on the direction of tuning, the adjustments to the input current signal may cause the amplitude of the input current signal to fall below $I_{TH}$ or exceed $I_{SAT}$.

In the instant example, during manufacturing, the apparatus 10 is operated with various pairs of thresholds stored in the registers 77 and 78 to discover a threshold pair that keeps the transmit power of the transmitter 22 in the desired range between +0.5 dBm and +5.0 dBm for GPON while satisfying the extinction ratio specified for the intended application. In this regard, the extinction ratio is a ratio of the $P_1$ optical power to the $P_0$ optical power, and the standard for a given application generally specifies a particular range for the extinction ratio. To remain compliant with the standard, the ratio of the $P_1$ optical power to the $P_0$ optical power must remain within the range specified by the standard for the extinction ratio. The threshold pair, referred to hereafter as the "GPON pair," identified for keeping the transmit power of the transmitter 22 in the desired range while satisfying the extinction ratio is then stored in the memory 58, as shown by block 112 of FIG. 6, and correlated with a particular transmit mode, referred to hereafter as the "GPON transmit mode."

The apparatus 10 is also operated with various pairs of thresholds stored in the registers 77 and 78 to discover a threshold pair that keeps the transmit power of the transmitter 22 in the desired range between −9.0 dBm and −3.0 dBm for Active Ethernet. Such pair, referred to hereafter as the "Active Ethernet pair," is then stored in the memory 58, as shown by block 112 of FIG. 6, and correlated with a particular transmit mode, referred to hereafter as the "Active Ethernet transmit mode." Accordingly, the apparatus 10 is configured to support two different transmit modes, GPON and Active Ethernet, in this example.

After manufacturing, a technician takes the apparatus 10 into the field for deployment in either a GPON or Active Ethernet application. For illustrative purposes, assume that the technician decides to deploy the apparatus 10 in a GPON application. In such an example, the technician installs the apparatus 10 and provisions it for use in GPON. As part of the provisioning process, the technician connects the user interface device 45 to the data port 42 as shown by FIG. 2. The technician then provides an input via the device 45 for selecting the GPON transmit mode.

In one exemplary embodiment, the system logic 56 displays to the technician, via the user interface device 45, a list of applications (i.e., GPON and Active Ethernet in the instant example) correlated with a transmit mode supported by the apparatus 10. That is, for each application in the list, the apparatus 10 is pre-configured to operate in a transmit mode in which the transmitter 22 is tuned to an operating range compatible with the correlated application. In the instant example, the user selects GPON thereby indicating that the transmitter 22 is to operate in the GPON transmit mode. In other embodiments, the data indicative of the desired transmit mode can be received from other sources.

Figure 6:
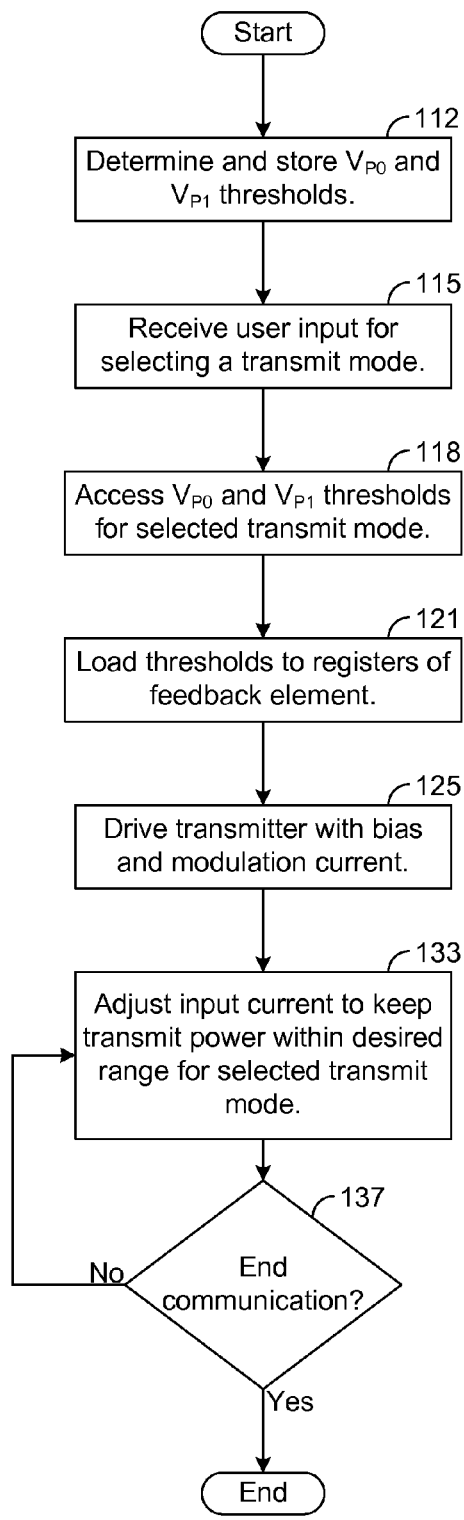
FIG. 6 is a flowchart illustrating an exemplary method for controlling a transmit power for an optical communication apparatus, such as is depicted by FIG. 2.

The system logic 56 (FIG. 2) receives the input for selecting the GPON transmit mode, as shown by block 115 of FIG. 6, and in response to such input, causes the transceiver 11 to tune the transmitter 22 for GPON. Specifically, the transceiver logic 33 tunes the transmitter 22 to transmit in a power range between +0.5 dBm and +5.0 dBm.

To enable such tuning, the system logic 56 searches for and finds in the settings data 81 the GPON pair correlated with the selected transmit mode, as shown by block 118 of FIG. 6, and the system logic 56 provides the GPON pair, $V_{P1}$ and $V_{P0}$, to the transceiver logic 33, which loads the GPON pair into the registers 77 and 78, respectively, as shown by block 121 of FIG. 6. The transceiver logic 33 then drives the transmitter 22 via the bias current signal transmitted across the connection 63 and the modulation current signal transmitted across the connection 64, as shown by block 125 of FIG. 6. The transceiver logic 33 adjusts the bias current signal and/or the modulation current signal based on the feedback signal from the power detector 52 and the power thresholds, $V_{P1}$ and $V_{P0}$, in the registers 77 and 78 of the feedback element 57 such that the transmit power of the transmitter 22 is tuned to be within the range of GPON (i.e., between +0.5 dBm and +5.0 dBm), as shown by block 133 of FIG. 6.

Specifically, the $I_{mod}$ control element 82 (FIG. 4) counts the consecutive number of times that the transmit power, as indicated by the feedback signal, exceeds $V_{P1}$ when the comparator 74 is activated by the transceiver logic 33, and the $I_{mod}$ control element 82 counts the consecutive number of times that the transmit power, as indicated by the feedback signal, is below $V_{P1}$ when the comparator 74 is activated by the transceiver logic 33. If either count exceeds a specified count threshold, the $I_{mod}$ control element 82 causes an adjustment to the modulation current signal, and then resets such count. In particular, if the count threshold is exceeded due to the voltage of feedback signal exceeding $V_{P1}$, then the $I_{mod}$ control element 82 causes the transceiver logic 33 to reduce the modulation current transmitted via the connection 64. However, if the count threshold is exceeded due to the voltage of the feedback signal falling below $V_{P1}$, then the $I_{mod}$ control element 82 causes the transceiver logic 33 to increase the modulation current transmitted via the connection 64.

Similarly, the $I_{bias}$ control element 83 counts the consecutive number of times that the transmit power, as indicated by the feedback signal, exceeds $V_{P0}$ when the comparator 75 is activated by the transceiver logic 33, and the $I_{bias}$ control element 83 counts the consecutive number of times that the transmit power, as indicated by the feedback signal, is below $V_{P0}$ when the comparator 75 is activated by the transceiver logic 33. If either count exceeds the count threshold, the $I_{bias}$ control element 83 causes an adjustment to the bias current signal, and then resets such count. In particular, if the count threshold is exceeded due to the voltage of the feedback signal exceeding $V_{P0}$, then the $I_{bias}$ control element 83 causes the transceiver logic 33 to reduce the bias current transmitted via the connection 63. However, if the count threshold is exceeded due to the voltage of the feedback signal falling below $V_{P0}$, then the $I_{bias}$ control element 83 causes the transceiver 33 to increase the bias current transmitted via the connection 63.

As shown by block 137, the transceiver logic 33 continues to adjust the input current based on comparisons of the feedback signal to the thresholds in the registers 74 and 75 of the feedback control element 57 until communication by the apparatus 10 is to end.

Figure 7:
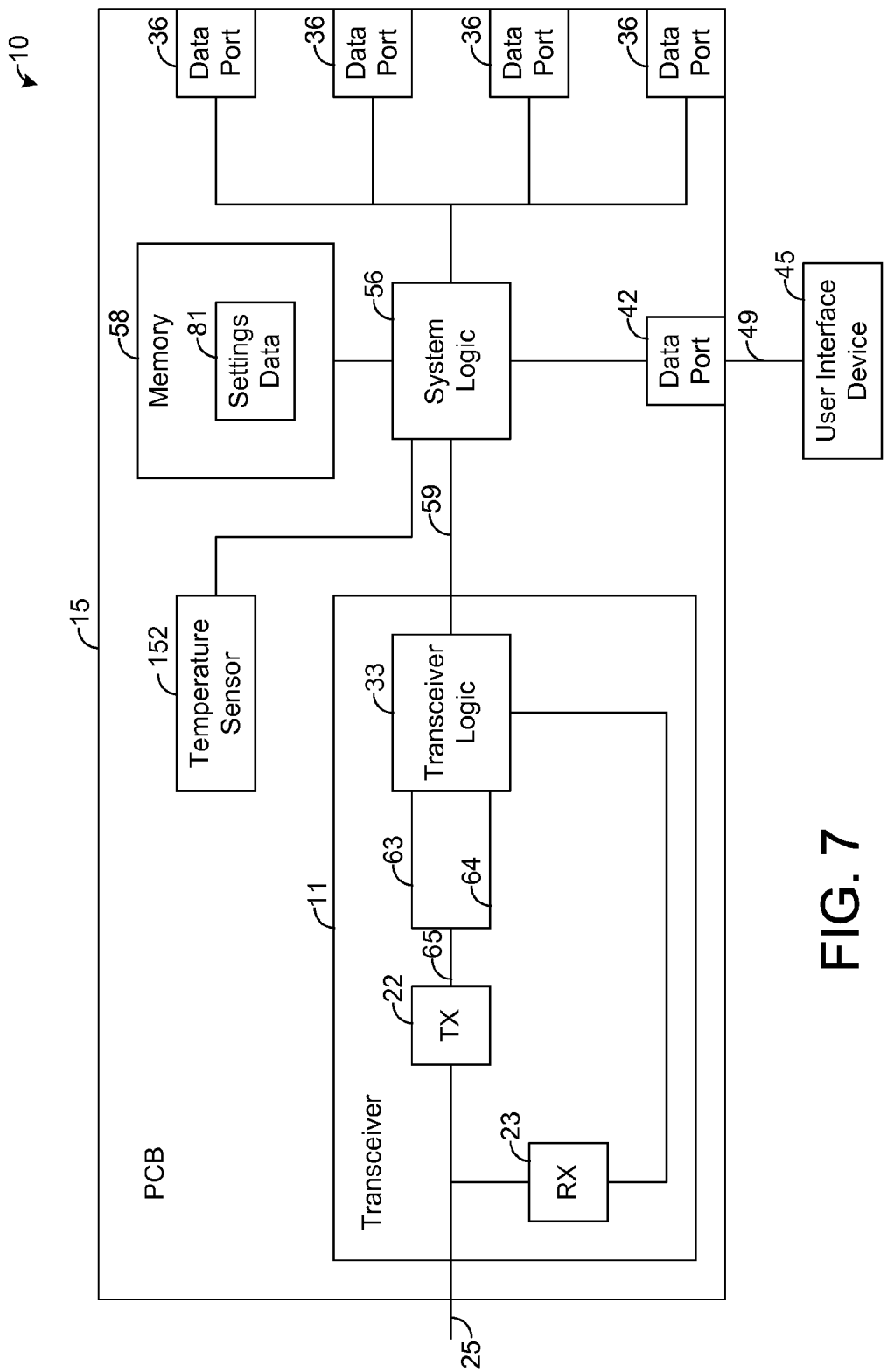
FIG. 7 is a block diagram illustrating an exemplary embodiment of an optical communication apparatus.

FIG. 7 depicts another exemplary embodiment of the optical communication apparatus 10. The embodiment depicted by FIG. 7 does not employ a power detector 52 or feedback element 57. Instead, the settings data 81 is defined to indicate the appropriate levels of bias current and modulation current, as a function of temperature, to be applied to the transmitter 22 in order to keep the transmit power within the desired range. Further, the optical communication apparatus 10 comprises a temperature sensor 152 for measuring a temperature of the apparatus 10. By comparing the measured temperature to the settings data 81, the system logic 56 selects or otherwise determines the appropriate levels for the bias current and the modulation current for keeping the transmit power in the desired range for the selected transmit mode. The system logic 56 communicates such levels to the transceiver logic 33, which then sets the bias current and the modulation current to the indicated levels.

As an example, assume that it is desirable for the apparatus 10 to be used in a GPON application. During manufacturing, the apparatus 10 is tested at various temperatures to determine a pair of modulation current and bias current levels at each such temperature that keep the transmit power within the desired range (i.e., between +0.5 dBm and +5.0 dBm for GPON) while satisfying the specified extinction ratio. For each test, the temperature and the determined modulation current and bias current levels are stored in the settings data 81. In such embodiment, the settings data 81 comprises a table of entries in which each entry indicates a temperature and a set of bias current and modulation current values that keep the transmit power within the desired range at that temperature. Note that, if desired, it is possible to generate only two or three test points since modulation and bias current levels at temperatures between or beyond these test data points can be estimated based on these measured values and well-known models of laser behavior.

FIG. 8 depicts an exemplary embodiment of the settings data 81 having a table 202 of entries for GPON. The first entry of the GPON table 202 indicates that, at temperature $T_1$, the transmitter 22 was determined to provide a transmit power within the desired range for GPON while satisfying the specified extinction ratio when the bias current signal was set to an amplitude of $I_{bias1}$ and when the modulation current signal was set to an amplitude of $I_{mod1}$. Thus, if the user indicates that GPON is the intended application and if the temperature measured by the temperature sensor 152 during operation is equal to $T_1$, the transceiver logic 33, under the control of the system logic 56, sets the current level of the bias current signal to equal $I_{bias1}$ and the current level of the modulation current signal to equal $I_{mod1}$ (when modulating a logical high value). If a temperature does not precisely match any entry in the table 202, then interpolation may be used to determine the appropriate amplitude of the bias current signal and the modulation current signal. Further, FIG. 8 shows three exemplary entries in the table 202 for illustrative purposes, but any table of the settings data 81 may have any number of entries in other embodiments. Further, a curve fit may be performed to determine the bias current and modulation current for temperatures between those actually tested.

In the instant embodiment, the settings data 81 has a table for each transmit mode supported by the apparatus 10. As an example, in addition to a table 202 for GPON, the settings data 81 also defines a table 205 for an Active Ethernet transmit mode, and such table 205 can be similarly used to keep the transmit power within the desired range for Active Ethernet (i.e., between −9.0 dBm and −3.0 dBm). In response to a user input for selecting a desired transmit mode, the system logic 56 is configured to access the table 202 or 205 for the selected mode and then use such table to control, based on temperature, the bias current and modulation current used to drive the transmitter 22. Thus, if Active Ethernet is selected by the user, then the transmitter 22 is controlled based on the table 205, instead of the table 202, such that its transmit power remains within the desired range for Active Ethernet.

Similar techniques may be used to control the bias voltage applied to the receiver 23 by the transceiver logic 33. In this regard, the receiver 23 can be tested over a temperature range to determine, for each temperature, which bias voltage provides the desired receiver sensitivity for the desired application. As an example, the GPON table 202 of FIG. 8 has a respective voltage bias value correlated with each temperature. The first entry of the GPON table 202 indicates that, at temperature $T_1$, the receiver 23 was determined to have receiver sensitivity within the desired range for GPON when the bias voltage applied to the receiver 23 was equal to $V_{bias1}$. Thus, if the user indicates that GPON is the intended application and if the temperature measured by the temperature sensor 152 during operation is equal to $T_1$, the transceiver logic 33, under the control of the system logic 56, sets the voltage bias applied to the receiver 23 to $V_{bias1}$. If a temperature does not precisely match any entry in the table 202, then interpolation or other techniques may be used to determine the appropriate bias voltage.

Further the table 205 is similarly defined to have a bias voltage indicated for each entry to enable the receiver 23 to be properly controlled for Active Ethernet. Each table 202 and 205 is correlated with a respective receive mode and is used to control the receiver sensitivity when the apparatus 10 is operating in the correlated receive mode. In this regard, in response to a user input for selecting a desired receive mode (e.g., a user input indicating GPON or Active Ethernet), the system logic 56 is configured to access the table 202 or 205 correlated with the selected receive mode and then use such table to control the bias voltage applied to the receiver 23. Thus, if Active Ethernet is selected by the user, then the receiver 23 is controlled based on the table 205, instead of the table 202, such that its sensitivity remains within a desired range for Active Ethernet.

The tables 202 and 205 described above pertain to GPON and Active Ethernet, but other types of applications and protocols are possible in other embodiments. Indeed, the techniques described herein can be used to keep the transmit power and/or receiver sensitivity in an appropriate range for any desired application.

Note that if a feedback element 57 is used to control the modulation current and the bias current, then there is no need for the tables 202 and 205 to include values for such current. However, the bias voltage and temperature values of the tables 202 and 205, in such embodiment, may nevertheless be used in conjunction with the temperature reading of the temperature sensor 152 to control the bias voltage applied to the receiver 23.

Figure 9:
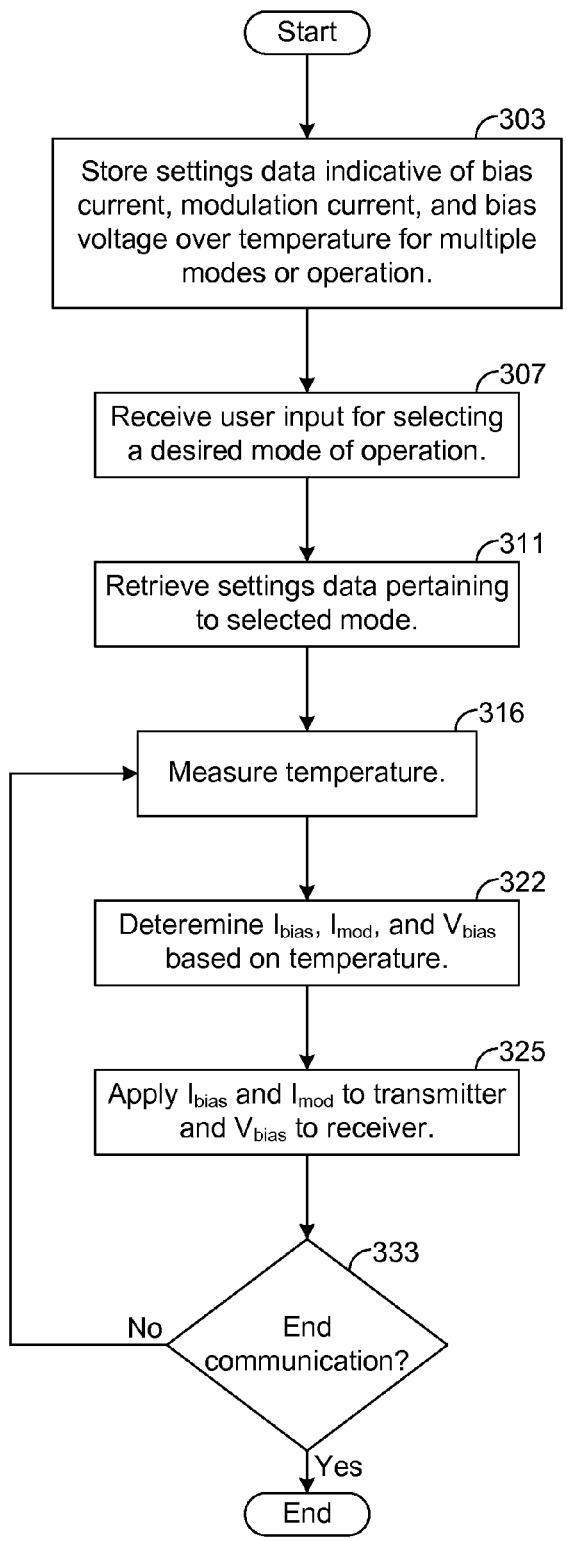
FIG. 9 is a flow chart illustrating an exemplary method for controlling a transmit power and receiver sensitivity for an optical communication apparatus, such as is depicted by FIG. 2.

FIG. 9 depicts an exemplary operation and use of the apparatus 10 for which data tables 202 and 205 are used to control the transmit power and receiver sensitivity. For illustrative purposes, assume that the apparatus 10 is configured to allow tuning of the transmit power and receiver sensitivity to levels compatible with GPON and Active Ethernet, though the apparatus 10 may be configured to allow the transmit power and receiver sensitivity to be tuned to levels compatible with other applications in other embodiments.

As shown by block 303 of FIG. 9, the settings data 81 is defined and stored in memory 58. In this regard, for each entry of the GPON table 202, the apparatus 10 is cooled or heated to the entry's temperature and then a test is performed to determine the bias current, modulation current, and bias voltage for providing suitable transmit power and receiver sensitivity. Specifically, a test pattern of data is used to modulate the modulation current signal, and the modulation current signal and the bias current signal are adjusted until the transmit power for the transmitter 22 is measured to be within a certain range compatible with GPON. Values indicative of the currents of the bias current signal and the modulation current signal that provide the desired transmit power are stored in the entry. In addition, the bias voltage applied to the receiver 23 is adjusted until the receiver 23 has a sensitivity within a certain range compatible with GPON. A value indicative of the bias voltage that provides the desired receiver sensitivity is also stored in the entry. If desired, only a few entries can be defined by such manner and additional entries may then be estimated based on the original test data.

For illustrative purposes, assume that a technician installs the apparatus 10 for use in a GPON application. As described above, the technician provides an input via the user interface device 42 for selecting GPON as the intended application for the apparatus 10. Such input is received by the system logic 56, as shown by block 307 of FIG. 9. In response, the system logic 56 operates the apparatus 10 in a GPON transmit mode and a GPON receive mode. In particular, the system logic 56 retrieves the portion of the setting data 81 pertaining to the selected mode, as shown by block 311 of FIG. 9, and more specifically for the instant example retrieves the GPON table 202.

As shown by block 316 of FIG. 9, the temperature sensor 152 measures the temperature of the apparatus 10 and transmits a value indicative of the measured temperature to the system logic 56. The system logic 56 determines values for the bias current, the modulation current, and the bias voltage correlated with the measured temperature by the GPON table 202, as shown by block 322 of FIG. 9, and the system logic 56 provides such values to the transceiver logic 33. As shown by block 325 of FIG. 9, the transceiver logic 33 adjusts the current of the bias current signal and the modulation current signal according to the bias current value and the modulation current value, respectively, from the system logic 56 and applies the adjusted bias current signal and modulation current signal to the transmitter 22. By driving the transmitter 22 with the bias current and the modulation current indicated by the system logic 56, the transmit power should be tuned to a range compatible with the intended application (i.e., GPON in the instant example). Also, the transceiver logic 33 applies the bias voltage indicated by the system logic 56 to the receiver 23 thereby causing the receiver 23 to operate with a sensitivity compatible with the intended application (i.e., GPON in the instant example).

If communication by the apparatus 10 is to continue, a "no" determination is made in block 333, and blocks 316, 322, and 325 are repeated for a new temperature measurement. Accordingly, as temperature fluctuates, the bias current, the modulation current, and the bias voltage are adjusted based on the GPON table 202 and the temperature sensor 152 such that the transmit power of the transmitter 22 and the sensitivity of the receiver 23 remain compatible with GPON.

The examples described above are presented to better illustrate the embodiments of the present disclosure, and various modifications and changes to the disclosed examples are possible. As an example, it is possible for the bias current and the modulation current to be controlled according to the methodology described above for FIG. 6 while the bias voltage for the receiver 23 is controlled according to the methodology described above for FIG. 9. Various other changes and modifications would be apparent to a person of ordinary skill upon reading this disclosure.

In addition, the exemplary transmit and receive modes have been described above in the context of GPON or Active Ethernet. However, there may be additional groupings of modes from which the desired transmit mode can be selected. As an example, there may be low power modes of operation to be used when the apparatus 10 is in close proximity to the optical communication apparatus (not shown) at the far end of the fiber 25 or, in other words, when the length of the fiber 25 is short.

In this regard, different lengths of the fiber 25 are possible and it is possible that a transmit power that is suitable for a given length of fiber 25 might saturate the receiver circuitry if the actual length of the fiber 25 is significantly less. In one exemplary embodiment, the optical communication apparatuses coupled to the fiber 25 are configured to communicate via a management and control channel across the fiber 25. If power of the received signal is greater than a predefined threshold, then the optical communication apparatuses switch to a low power mode of operation in which the transmit power is reduced in an effort to prevent saturation of the receive circuitry.

As an example, assume that the optical communication apparatus 10 is provisioned to operate in a GPON application such that the GPON table 202 of FIG. 8 is used to establish the modulation current and bias current provided to the transmitter 22 and the bias voltage provided to the receiver 23. However, assume that the length of the fiber 25 is relatively short such that the receive power is close to saturating the circuitry of the transceiver logic 33.

During operation, the transceiver logic 33 is configured to measure the output current of the receiver 23 and to compare such output current measurement to a threshold. If the threshold is exceeded, then the transceiver logic 33 is configured to transition to a low power mode of operation that is compatible with GPON. In this regard, the memory 58 preferably stores another GPON table (not shown), referred to hereafter as a "low power GPON table," like the table 202 shown by FIG. 8 except that the values in the low power GPON table cause the transceiver logic 33 to control the transmitter 22 to operate at lower transmit power and to bias the receiver 23 at a lower voltage. When the transceiver logic 33 switches to the low power mode of operation, the transceiver logic 33 begins to use the values of the low power GPON table rather than the GPON table 202 of FIG. 8 to control the bias current, modulation current, and bias voltage thereby tuning the transmitter 22 to a lower transmit power and tuning the receiver's sensitivity to lower power range. Further, the transceiver logic 33 communicates with the other optical communication apparatus at the far end of the fiber 25 so that this far-end apparatus similarly transitions to a low power mode of operation. By so transitioning, the operating points of the transceivers at both ends are lowered thereby reducing the likelihood that the receiver circuitry at either end will saturate.

Note that similar techniques may be used to transition a transceiver 11 that uses a feedback element 57 to control the modulation current and bias current, as shown by FIG. 3. In such an embodiment, the values stored in the registers 77 and 78 can be updated to tune the transmit power of the transmitter 22 to a lower power.

In addition, it is unnecessary for the transceiver logic 33 to transition both the transmit mode and the receive mode to low power modes based on the output current of the receiver 23. As an example, the transceiver logic 33 may only transition the receiver 23 to a low power mode based on the output current of the receiver 23. The transceiver logic 33 may then transition the transmitter 22 to a lower power mode of operation only if instructed to do so by the far-end communication apparatus. Various other changes and modifications would be apparent to a person of ordinary skill upon reading this disclosure.

Now, therefore, the following is claimed:

1. An optical communication apparatus, comprising:
an optical transmitter operable in a plurality of transmit modes, wherein each of the transmit modes corresponds to a respective operating range for a transmit power of the optical transmitter; logic configured to receive at least one user input for selecting one of the transmit modes, the logic configured to provision in response to the at least one user input the optical communication apparatus to operate the optical transmitter in the selected transmit mode such that the transmit power of the optical transmitter is tuned to the operating range corresponding to the selected transmit mode; and an optical receiver operable in a plurality of receive modes, wherein each of the receive modes corresponds to a respective bias voltage for the optical receiver, wherein the logic is configured to select one of the receive modes based on the at least one user input, and wherein the logic is configured to provision the optical communication apparatus to operate the optical receiver in the selected receive mode such that the bias voltage corresponding to the selected receive mode is applied to the optical receiver.

2. The apparatus of claim 1, wherein the logic is configured to drive the optical transmitter with an input current thereby controlling the transmit power, wherein the logic is configured to receive a feedback signal indicative of the transmit power and to compare the feedback signal to a threshold, wherein the logic is configured to adjust the input current based on a comparison of the feedback signal to the threshold, and wherein the logic is configured to select the threshold based on which of the transmit modes is selected by the user input.

3. The apparatus of claim 1, further comprising a temperature sensor, wherein the logic is configured to drive the optical transmitter with an input current thereby controlling the transmit power, and wherein the logic is configured to adjust the input current based on the temperature sensor.

4. The apparatus of claim 1, wherein the operating range corresponding to one of the transmit modes is between −9.0 dBm and −3.0 dBm, and wherein the operating range corresponding to the selected transmit mode is between +0.5 dBm and +5.0 dBm.

5. The apparatus of claim 1, wherein the logic is configured to transition the selected transmit mode to a new transmit mode based on a power level of a signal received from an optical fiber coupled to the optical transmitter.

6. The apparatus of claim 1, wherein the optical receiver comprises an avalanche photodiode, and wherein the bias voltage corresponding to the selected receive mode is applied to the avalanche photodiode.

7. The apparatus of claim 1, wherein the logic is configured to compare current from the optical receiver to a threshold, wherein the logic is configured to transition the selected receive mode to a new receive mode based on a comparison of the current to the threshold.

8. The apparatus of claim 1, wherein the optical transmitter comprises a laser diode within an optical sub-assembly.

9. An optical communication method, comprising:
providing an optical transmitter operable in a plurality of transmit modes, wherein each of the transmit modes corresponds to a respective operating range for a transmit power of the optical transmitter;
receiving at least one user input;
selecting one of the transmit modes based on the at least one user input;
controlling the optical transmitter to operate in the selected transmit mode in response to the at least one user input, wherein the controlling comprises tuning the transmit power of the optical transmitter to the operating range corresponding to the selected transmit mode;
providing an optical receiver operable in a plurality of receive modes, wherein each of the receive modes corresponds to a respective bias voltage for the optical receiver;
selecting one of the receive modes based on the at least one user input; and
controlling the optical receiver to operate in the selected receive mode in response to the at least one user input, wherein the controlling the optical receiver comprises applying, to the optical receiver, the bias voltage corresponding to the selected receive mode.

10. The method of claim 9, wherein the tuning comprises:
driving the optical transmitter with an input current thereby controlling the transmit power;
receiving a feedback signal indicative of the transmit power;
comparing the feedback signal to a threshold; and
adjusting the input current based on the comparing,
wherein the method further comprises selecting the threshold based on the selected transmit mode.

11. The method of claim 9, wherein the tuning comprises:
driving the optical transmitter with an input current thereby controlling the transmit power;
measuring a temperature; and
adjusting the input current based on the measured temperature.

12. The method of claim 9, further comprising:
receiving an optical signal from an optical fiber coupled to the optical transmitter;
converting the optical signal to electrical current;
comparing the electrical current to a threshold; and
transitioning the optical transmitter from the selected transmit mode to a new transmit mode based on the comparing.

13. The method of claim 9, wherein the operating range corresponding to one of the transmit modes is between −9.0 dBm and −3.0 dBm, and wherein the operating range corresponding to the selected transmit mode is between +0.5 dBm and +5.0 dBm.

14. The method of claim 9, wherein the optical receiver comprises an avalanche photodiode.

15. The method of claim 9, further comprising:
receiving an optical signal from an optical fiber coupled to the optical transmitter;
converting the optical signal to electrical current;
comparing the electrical current to a threshold; and
transitioning the optical receiver from the selected receive mode to a new receive mode based on the comparing.

16. The method of claim 9, wherein the optical transmitter comprises laser diode within an optical sub-assembly.

17. An optical communication system, comprising:
an optical fiber; and
an optical communication apparatus coupled to the optical fiber and having an optical transmitter operable in a plurality of transmit modes, wherein each of the transmit modes corresponds to a respective operating range for a transmit power of the optical transmitter, the optical transmitter configured to receive data and to modulate an optical signal with the data, the optical transmitter further configured to transmit the modulated optical signal through the optical fiber, the optical communication apparatus configured to receive at least one user input for selecting one of the transmit modes, the optical communication apparatus configured to operate the optical transmitter in the selected transmit mode such that the transmit power of the optical transmitter is tuned to the operating range corresponding to the selected transmit mode, wherein the optical communication apparatus has an optical receiver operable in a plurality of receive modes, wherein each of the receive modes corresponds to a respective bias voltage for the optical receiver, wherein the optical communication apparatus is configured to select one of the receive modes based on the at least one user input, and wherein the optical communication apparatus is configured to operate the optical receiver in the selected receive mode such that the bias voltage corresponding to the selected receive mode is applied to the optical receiver.

18. The system of claim 17, wherein the optical transmitter comprises a laser diode within an optical sub-assembly.

* * * * *